US009495092B2

(12) United States Patent
Kim et al.

(10) Patent No.: US 9,495,092 B2
(45) Date of Patent: Nov. 15, 2016

(54) METHOD AND APPARATUS FOR CONTROLLING DETAILED INFORMATION DISPLAY FOR SELECTED AREA USING DYNAMIC TOUCH INTERACTION

(75) Inventors: Yeon Ji Kim, Gyeonggi-do (KR); Sung Tae Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 210 days.

(21) Appl. No.: 13/527,767

(22) Filed: Jun. 20, 2012

(65) Prior Publication Data
US 2013/0154962 A1    Jun. 20, 2013

(30) Foreign Application Priority Data

Dec. 14, 2011 (KR) .......................... 10-2011-0134915

(51) Int. Cl.
G06F 3/0488 (2013.01)
(52) U.S. Cl.
CPC ... G06F 3/0488 (2013.01); *G06F 2203/04806* (2013.01)
(58) Field of Classification Search
CPC ...................... G06F 3/017; G06F 3/048; G06F 3/0481; G06F 3/04812; G06F 3/0482
USPC ........................ 345/173–183; 715/808, 863
See application file for complete search history.

(56) References Cited

U.S. PATENT DOCUMENTS

| | | | | |
|---|---|---|---|---|
| 5,559,707 A | * | 9/1996 | DeLorme ............... | G01C 21/20 340/990 |
| 5,802,492 A | * | 9/1998 | DeLorme ........... | G01C 21/3476 340/990 |
| 5,948,040 A | * | 9/1999 | DeLorme ............. | 701/426 |
| 8,458,173 B2 | * | 6/2013 | Laurenzo ............... | G01C 21/32 707/723 |
| 8,490,025 B2 | * | 7/2013 | Jakobson ........... | G01C 21/3682 715/712 |
| 8,504,945 B2 | * | 8/2013 | Jakobson ........... | G01C 21/3679 715/712 |
| 2008/0074558 A1 | * | 3/2008 | Watanabe et al. ............ | 348/734 |
| 2009/0153492 A1 | * | 6/2009 | Popp .............................. | 345/173 |
| 2009/0171576 A1 | | 7/2009 | Kim et al. | |

(Continued)

FOREIGN PATENT DOCUMENTS

JP   10141974 A    5/1998
JP   2008111752 A  5/2008

(Continued)

*Primary Examiner* — Gene W Lee
(74) *Attorney, Agent, or Firm* — Mintz Levin Cohn Ferris Glovsky and Popeo, P.C.; Peter F. Corless

(57) ABSTRACT

A method and apparatus configured to control the level of detailed information displayed for a selected area using a dynamic touch interaction in a mobile terminal including a touch screen, are provided. The apparatus include a memory that stores contents to be output through the touch screen as data, a touch interaction module that analyzes a user's touch input through the touch screen and recognizes a stipulated touch interaction, and a control unit that controls an overall operation of the apparatus according to the user's input through the touch screen. The control unit also controls the level of subordinate detailed information displayed in an area, which is designated by the user through a stipulated touch input, to be displayed when the stipulated touch input is recognized through the touch interaction module, based on the data stored in the memory.

10 Claims, 7 Drawing Sheets

(56) References Cited

U.S. PATENT DOCUMENTS

| | | | |
|---|---|---|---|
| 2009/0192703 A1* | 7/2009 | Hess | G01C 21/3461 701/532 |
| 2009/0198767 A1* | 8/2009 | Jakobson | G01C 21/3679 709/203 |
| 2009/0307631 A1* | 12/2009 | Kim et al. | 715/830 |
| 2010/0082242 A1* | 4/2010 | Park | G01C 21/00 701/532 |
| 2010/0088641 A1 | 4/2010 | Choi | |
| 2010/0146436 A1* | 6/2010 | Jakobson | G01C 21/3682 715/800 |
| 2010/0240402 A1* | 9/2010 | Wickman et al. | 455/466 |
| 2010/0299638 A1* | 11/2010 | Choi | 715/835 |
| 2011/0145228 A1* | 6/2011 | Laurenzo | G01C 21/32 707/723 |
| 2011/0153186 A1* | 6/2011 | Jakobson | 701/200 |
| 2012/0242852 A1* | 9/2012 | Hayward et al. | 348/222.1 |

FOREIGN PATENT DOCUMENTS

| | | |
|---|---|---|
| JP | 2008304324 A | 12/2008 |
| KR | 10-2008-0070226 | 7/2008 |
| KR | 10-2008-0090087 | 10/2008 |
| KR | 1020090071076 A | 7/2009 |
| KR | 1020100038651 A | 4/2010 |
| KR | 10-2010-0083432 | 7/2010 |
| KR | 10-2010-00127081 | 12/2010 |
| KR | 10-2011-0047816 | 5/2011 |

\* cited by examiner

METHOD AND APPARATUS FOR CONTROLLING DETAILED INFORMATION DISPLAY FOR SELECTED AREA USING DYNAMIC TOUCH INTERACTION

CROSS-REFERENCES TO RELATED APPLICATIONS

This application claims priority to Korean patent application No. 10-2011-0134915 filed on Dec. 14, 2011, the disclosure of which is hereby incorporated in its entirety by reference.

BACKGROUND OF THE INVENTION

1. Field of the Invention

The present invention relates to technology for controlling a screen output in mobile terminals having a touch screen, and more particularly, to a method and apparatus for controlling detailed information display for a selected area using dynamic interaction, which allow detailed information or subordinate contents within a selected area by a user to be displayed on a screen when executing a stipulated touch input by the user using two touch points.

2. Description of the Related Art

Over the years mobile terminals/devices have become lighter, thinner, simpler and smaller in appearance, and their utilities and functions thereof become more various and complex. In particular, recently, the mobile terminals have been developed into a single device that is capable of performing various multimedia functions such as taking an image or a moving image, reproducing music or an image file, or gaming in addition to typical basic functions such as a broadcast reception apparatus or a communication apparatus, in response to a user's demand. As a result, information, which should be transmitted to the user by the mobile apparatus, has become increased and diversified.

However, display elements that are used to display content on a screen, have also become thinner and smaller. Accordingly, the contents which may be used to effectuate content display on the device have become limited due to the size of the display as well.

Since carrying convenience is preferentially a prerequisite to mobile terminals these days, the body size of the mobile apparatus is also necessarily restricted and thus the display apparatus has a limited body size as well.

Accordingly, As a result of these screen reductions, the amount of visible content has also been reduced at any given time on the screens as well in certain situations. Thus, it is not easy for a user to select this subordinate information while the previously selected content is being displayed. Thus, in the conventional art, in order for the user to access this subordinate information the user must undergo a number of "touch input steps" to again reach the subordinate information, thus it is highly inconvenient for a user to effectively move from one piece of selected content to a subordinate piece of content material.

In an effort increase the content visibility on these smaller screens, some companies have developed a "fish eye user interface (UI)" which magnifies certain locations of the UI so that that selected portion may be enhanced to a larger size. However, much like the previous designs, only the selected are is focused and visible in actuality to the user. Therefore, it is necessary to provide a new interaction method in which the detailed contents of a subordinate folder concept are easily utilized by a simple touch input.

SUMMARY OF THE INVENTION

Various aspects of the present invention have been made in view of the above problems, and provide a method and apparatus for controlling a detailed information display within an area selected by a user using dynamic touch interaction, which allows detailed information or subordinate content within a selected area by a user to be displayed on a screen when executing a stipulated touch input by the user using two touch points.

According to an aspect of the present invention, an apparatus for controlling detailed information display for a selected area using dynamic touch interaction in a mobile terminal that includes a touch screen. The apparatus may include a memory that stores contents to be output through the touch screen as data, and a touch interaction module that analyzes a user's touch input through the touch screen and recognizes stipulated touch interaction. A control unit that controls an overall operation of the apparatus according to the user's input through the touch screen. The control unit also controls subordinate detailed information for content displayed within a given area, which is designated by the user through a stipulated touch input, to be displayed when the stipulated touch input is identified through the touch interaction module, based on the data stored in the memory.

The memory may be a phased detailed information storage unit that separates and stores detailed point of interest (POI) information for the contents to be output through the touch screen based on a control commands from the control unit according depth levels and content information corresponding to a corresponding depth level based on execution of an user's stipulated touch input is stored in the storage unit which is allocated according to the depth levels. Thus, the touch interaction module may be embodied in the control unit.

According to another aspect of the present invention, a method of controlling detailed information display for a selected area using dynamic touch interaction in a mobile terminal including a memory that stores contents to be output through a touch screen as data, and a control unit that controls contents according to a user command to be output based on the data stored in the memory. The method may include recognizing a touch input of a first pattern input through the touch screen; detecting an interaction depth of the first touch input when the touch input of the first pattern is recognized; reading out detailed POI information of depth levels corresponding to the interaction depth detected by detecting an interaction depth of the touch input; and outputting contents of the information read from detailed POI information on the touch screen.

The touch input of the first pattern may include selecting an area using two pointers that are touched on the touch screen. The contents output on the touch screen may be configured as navigation information. The detailed POI information may include at least one of geographic information, location information, and/or building information of a main building or a place included in the area selected by the touch input of the first pattern. The contents output on the touch screen may include a menu list of information. The detailed POI information may include subordinate item information included in the area selected by the touch input of the first pattern. In some embodiments, the touch input of the first input may be executed by dragging or flicking a touch point.

In some illustrative embodiments of the present invention, detecting an interaction depth may include determining the interaction depth by generalizing the number of executed first pattern touch inputs, a drag distance, magnitude of a pressure detected on the touch panel, etc.

The method may further include inputting a touch input of a second pattern in which two pointers touched on a screen of the touch screen are dragged close to each other; and detecting an interaction depth of the second touch input when the touch input of the second pattern is recognized. The reading out the contents may include reading out detailed POI information of a super ordinate depth level corresponding to the interaction depth of the second pattern from the memory when the touch input of the second pattern is recognized.

The touch input of the first pattern may include defining an area having a radius that is a distance from a first touch point as a center to a second touch point when a second touch pointer touches the screen of the touch screen within a predetermined time from when the first pointer touches the screen of the touch screen.

According to the present invention having the forgoing configurations, the user can output and see detailed POI information included in the contents within the selected area by designating the desired range of the contents through the simple touch input without a separate cumbersome input. Thus, it is the present invention allows the user to dynamically adjust the viewable area of the content selected by the user while at the same providing the content on a relative small thin screen.

The apparatuses and methods of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
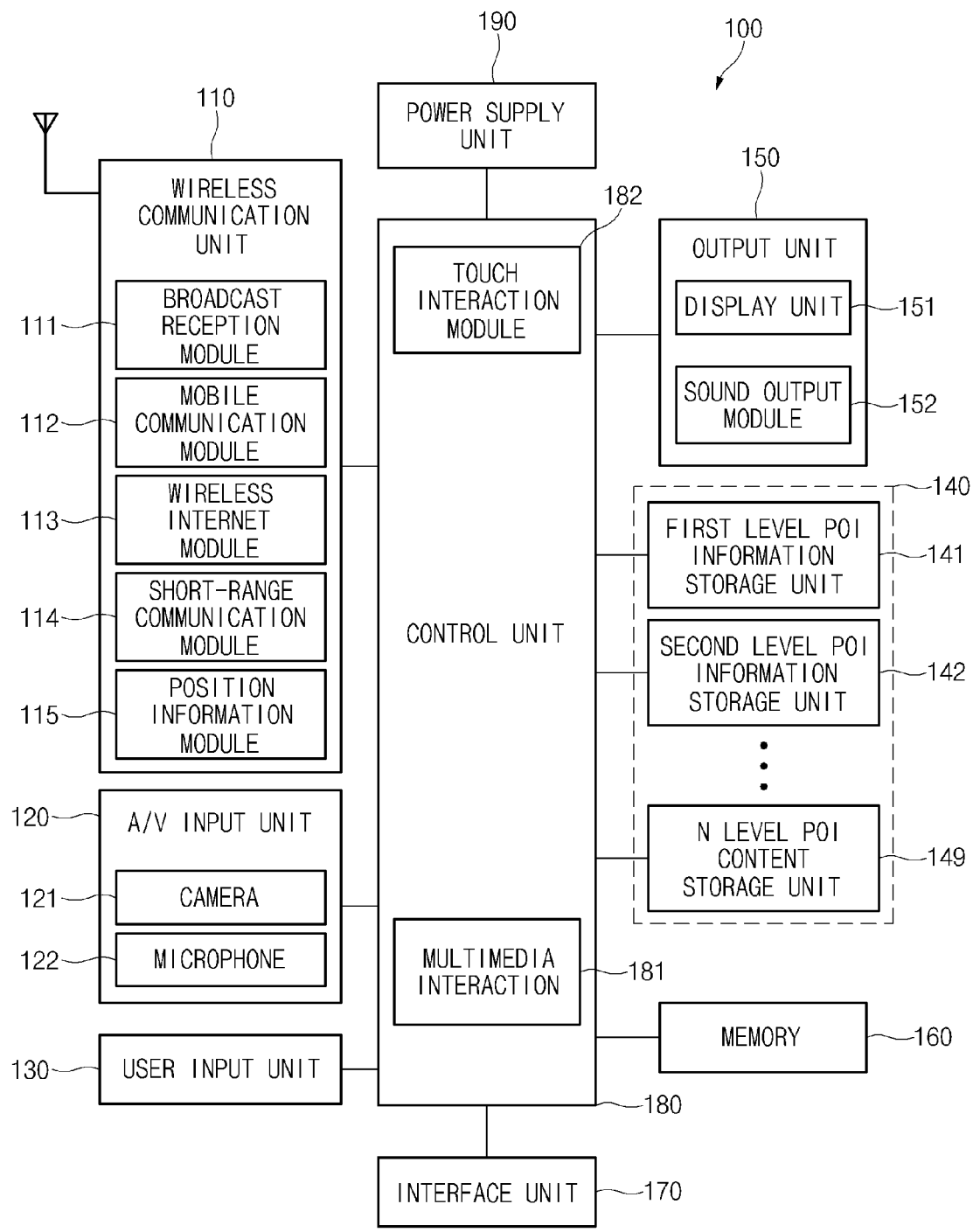
FIG. 1 is a block diagram illustrating a main configuration of a terminal having a function for controlling detailed information display for a selected area using dynamic touch interaction according to an exemplary embodiment.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Suffixes 'module' and 'unit' to the configuration elements that will be described in the following descriptions, are given or mixed for only easily explaining, they do not have means or roles different from each other per se.

FIG. 1 is a block diagram illustrating a main configuration of a terminal that is configured to control a detailed information display for a selected area using dynamic touch interaction according to an exemplary embodiment.

Although the exemplary embodiment describes an example applied to a navigational apparatus for vehicles, this is merely one embodied example. According to the user's convenience, it may be terminals, which may be carried or installed in the other utility units. Also, it may be embodied in various forms such as mobile phones, smart phones, laptop computers, digital broadcast reception terminals, personal digital assistants (PDAs), portable multimedia players (PMPs), tablet computers.

As shown in FIG. 1, the mobile terminal for the vehicle according to an exemplary embodiment includes a wireless communication unit 110, an audio/video (A/V) input unit 120, a user input unit 130, a phased detailed information storage unit 140, an output unit 150, a memory 160, an interface unit 170, a control unit 180, and a power supply unit 190.

The wireless communication unit 100 may include at least one module that enables wireless communication between the mobile terminal 100 and a wireless communication system or between the mobile terminal 100 and a network that is provided in the area where the mobile terminal 100 is located. That is, for example, the wireless communication unit 110 may include a broadcast reception module 111, a mobile communication module 112, a wireless Internet module 113, a short-range communication module 114, a position information module 115, and/or the like.

The broadcast reception module 111 may be configured to receive a broadcast signal/data through an antenna or receive broadcast-related information through a separate broadcast channel from an external broadcast administration server, and the broadcast channel may include a satellite channel, and a ground wave channel.

Meanwhile, the broadcast administration server may be embodied as a server that generates and transmits a broadcast signal/data and/or broadcast-related information. The broadcast administration server may also be embodied as a server that receives a pre-generated broadcast signal and/or broadcast-related information and transmits the received broadcast signal and/or broadcast-related information to the terminal accordingly. In addition, the data broadcast signal may include a television (TV) broadcast signal, a radio broadcast signal, a data broadcast signal such as traffic information (for example, transport protocol expert group (TPEG) information). Alternatively, the broadcast signal may include a broadcast signal in which the data broadcast signal is combined with the TV broadcast signal or the radio broadcast signal, etc.

The broadcast-related information may include information related to the broadcast channel, a broadcast program or a broadcast service provider. The broadcast-related information may be received through a mobile communication network by the mobile communication module 112, or be provided in a form of Internet protocol (IP) contents through the wireless Internet module 113.

In addition, the broadcast-related information may be received using various digital broadcast systems such as Electronic Program Guide (EPG), Digital Multimedia Broadcasting (DMB), Digital Video Broadcast-Terrestrial (DVB-T, Digital Multimedia Broadcasting-Satellite (DMB-S), Media Forward Link Only (Media FLO), Digital Video Broadcast-Handheld (DVB-H), or Integrated Services Digital Broadcast-Terrestrial (ISDB-T). The broadcast reception module 111 may include the above-described digital broadcast reception apparatus, and may be configured to be suitable to a broadcast system of a different form, including an analog broadcast, as necessary, other than the broadcast system which has been described in the exemplary embodiment.

The broadcast signal and/or the broadcast-related information received through the broadcast receiving module 111 may be stored in the memory 160, as necessary.

The mobile communication module 112 transmits/receives a wireless signal to/from at least one of a base station, an external terminal, and a server on a mobile communication network. The wireless signal may include various kinds of data according to a voice call signal, image communication call signal or text/multimedia message transmission/reception.

The wireless Internet module 113 is a configuration for wireless Internet access and may be built in the mobile terminal 100 or may be coupled in the outside of the mobile terminal. As wireless Internet technology, Wireless Local Area Network (WLAN) (Wi-Fi), Wireless broadband (Wibro), World Interoperability for Microwave Access (Wimax), High Speed Downlink Packet Access (HSDPA) and the like may be used.

Meanwhile, the short-range communication module 114 is configured to perform short-range communication. Blue tooth, Radio Frequency Identification (RFID), Infrared Data Association (IrDA), Ultra Wideband (UWB), ZigBee, and the like may be used.

The position information module 115 is configured to acquire position information of the mobile terminal 100, for instance, a global position system (GPS) may be used. The control unit calculates the current position of the terminal by synthetically calculating a GPS satellite signal received by the position information module 115 and then displaying the current position on a map through the display unit 151 which will be described later. The position information module may also allow the user to execute route guidance, display and collected information related to a vehicle's driving speed, display the direction of travel and the like based on the calculated result.

As shown in FIG. 1, the A/V input unit 120 is configured to receive image information and voice information and may include a camera 121, a microphone 122, and/or the like. The camera 121 generates an image frame of a still image or a moving image which is obtained by an image sensor when the camera is in a record mode of a black box in vehicle. The generated image frame may be displayed on the display unit 151.

Meanwhile, the image frame generated from the camera 121 may be stored in the memory 160 or be transmitted to the outside through the wireless communication unit 110. According to a user's environment, at least two cameras 121 may be provided such that a multi-channel black box function simultaneously shoots, for example, images in at least two directions of a front and rear of the vehicle.

The microphone 122 receives external sound information through a microphone, and then converts and processes the external sound information into an electric sound signal in a communication mode, a record mode, a voice recognition mode, and/or the like. In the communication mode, the converted voice signal is processed in a form transmittable to the mobile communication base station by the mobile communication module 112 and output through an antenna accordingly. The user may then directly input a destination or starting place for searching a course through his or her voice input. A variety of noise removal algorithms may be embodied in the microphone 122 to remove noise generated during receiving the external sound information.

The user input unit 130 is configured to generate input information that controls the overall operation of the apparatus according to the user's operational characteristics and may be configured as a key pad, a dome switch, a touch pad (static pressure/static electricity), a jog wheel, a jog switch and/or the like.

The output unit 150 is configured to display results, in which the mobile apparatus 100 processes the user's command, as a signal that the user can identify, through five senses by a stipulated signal processes, and includes the display unit 151 and a sound output module 152 which are representative output devices. The display unit 151 displays the data processed in the mobile apparatus 100 on the screen as visual information. For example, in the navigation mode, the display unit 151 displays information such as a current position, destination, a route, a map, speed, direction, street instructions, and/or the like which are related to a vehicle's movement on the screen, and provides a user interface (UI) related to the displayed information. In the black box mode or the shooting mode, the display unit provides a captured image, a UI or a graphic user interface (GUI).

Meanwhile, the display unit 151 may include at least one of an liquid crystal display (LCD), a thin film transistor-liquid crystal display (TFT-LCD), an organic light-emitting diode (OLED), a flexible display, a three-dimensional (3D) display, a dual play in which different images are displayed according to different view directions (for example, an output device in which when viewing one display at a driver seat, a map is displayed, and when viewing the display at a passenger seat, a broadcast screen is viewed), and/or the like.

Some of the various display apparatuses may be embodied as a transparent type or a light transmission type apparatuses which see through to the outside. However, preferably, a transparent organic light-emitting diode (TOLED) may be typically used. The display unit 151 may be also embodied in the light transmission type in a rear side thereof, that is, a rearward structure. By such structures, the user can view the object located a rear side of a body of the mobile terminal through an area, which the display unit 151 of the body of the mobile apparatus occupies.

In addition, at least two display units 152 may exist according to an embodied type of the mobile apparatus 100. For example, a plurality of display units may be arranged spaced apart on one or in an integral manner, or may be separately arranged on the different surfaces. When the display unit 151 and a sensor (hereinafter referred to as a 'touch sensor') which senses a touch operation of the user has a layered structure, the display unit 151 may be used as an input device in addition to an output device. For example, the touch sensor may have a touch film, a touch sheet, a touch pad, or the like installed thereon.

The touch sensor is configured to convert a change of a pressure or static electricity applied to a special area of the display unit 151 into an electronic input signal. The touch sensor may be installed in the user input unit 130 or the output unit 150 and configured to detect the pressure and location at which the display unit was touched.

When the touch input to the touch sensor exists, a signal corresponding to contact is generated and transmitted to a touch controller (not shown), and the touch controller transmits signal-processed data to the control unit 180. Thereby, the control unit 180 recognizes which area of a display panel has been touched Hereinafter, for clarity, when a pointer is proximally located and approaching the touch screen but the pointer has yet to directly in contact with the touch screen, is referred to as a 'proximity touch', and when the pointer actually makes direct contact with the touch screen, is referred to as a 'contact touch'. On the touch screen, the position at which the proximity touch is executed by the pointer may be defined as a position vertically corresponding to the touch screen from the pointer when the pointer approaches the touch screen. In addition, the touch screen may simultaneously sense the touch signal applied to two points or more, and thus is referred to as a 'multi-touch'.

Meanwhile, in a multimedia file reproducing mode, a broadcast reception mode, and the like, the sound output module 152 may output audio data received from the wireless communication unit 110 or stored in the memory 160 as an audible sound. The sound output module 152 may output sound guidance related to a function, which is executed in the mobile apparatus 100 (such as, an alarm sound, a notification sound, a course guidance sound, and the like), and include a receiver, a speaker, a buzzer, and/or the like.

The memory 160 may store a program for processing and controlling data processing of the control unit 180, retain content material such as a telephone directory, map information, audio and video information as data, and temporarily data input/output through the user input unit 130 and the output unit 150.

The memory 160 may store frequency in use of each data (such as a frequent destination, frequency to each multimedia file) together, and stores data about vibrations and sounds of various patterns, which are recognized upon touch input on the touch screen.

The memory 160 may include any one type of a storage medium selected from storage media having a flash memory type, a hard disk type, a multimedia card micro type, or a SD or XD card type, a random access memory (RAM), a static random access memory (SRAM), a read only memory (ROM), an electrically erasable programmable ROM (EEPROM), a programmable ROM (PROM), a magnetic disk, and an optical disk. Alternatively, the mobile apparatus 100 may be configured to communicate with the web storage that executes a data storage function on the Internet instead of the memory 160.

The interface unit 170 executes a routing role with any external apparatus connected with the mobile apparatus 100. The interface unit 170 receives data from the external apparatus, transmits supplied power to the each configuration element in the mobile apparatus 100, and transmits processed data in the mobile apparatus 100 to the external apparatus. The interface unit 170 may include a wired/wireless headset port, an external charger port, a wired/wireless data port, a video I/O port, an earphone port, and the like.

When the mobile apparatus 100 is connected with an external cradle, the interface unit 170 may become a router through which power from the cradle is supplied to the mobile apparatus 100 or through which various command signals input from the cradle are transmitted to the mobile apparatus 100. The various command signals or power input from the cradle may be used to recognize a state in which the mobile apparatus 100 is precisely installed in the cradle.

The control unit 180 is configured to control an overall operation of the mobile apparatus 100 and perform control and data processing for data communication, course searching, black box recording, and like. In addition, the control unit 180 is provided with a touch interaction module 182 configured to analyze a signal input through the touch sensor according to the stipulated standards and convert the analyzed signal into a corresponding command.

In FIG. 1, a phased detailed information storage unit 140 separately stores detailed POI information about contents to be output through the display unit 151 by control of the control unit 180 according to various depth levels. The storage units 141-149 allocated to each of the depth levels stores content information corresponding to a corresponding depth level according to executing the stipulated touch input by the user.

As shown in FIG. 1, although the phased detailed information storage unit 140 may be separately configured from the memory 160, the phased detailed information storage unit 140 may be embodied in the memory 160, as necessary. Alternatively, the phased detailed information storage unit 140 may be embodied to convert and output the content information on a display screen according to sections thereof by selectively accessing the content information stored in the memory 160 without including a separation storage module therein.

The multimedia module 181 and the touch interaction module 182 are not necessarily embodied in the control unit 180 and may be embodied separately from the control unit 180. Additionally, the power supply unit 190 supplies operation power to the whole of the apparatus according to control of the control unit 180.

Figure 2:
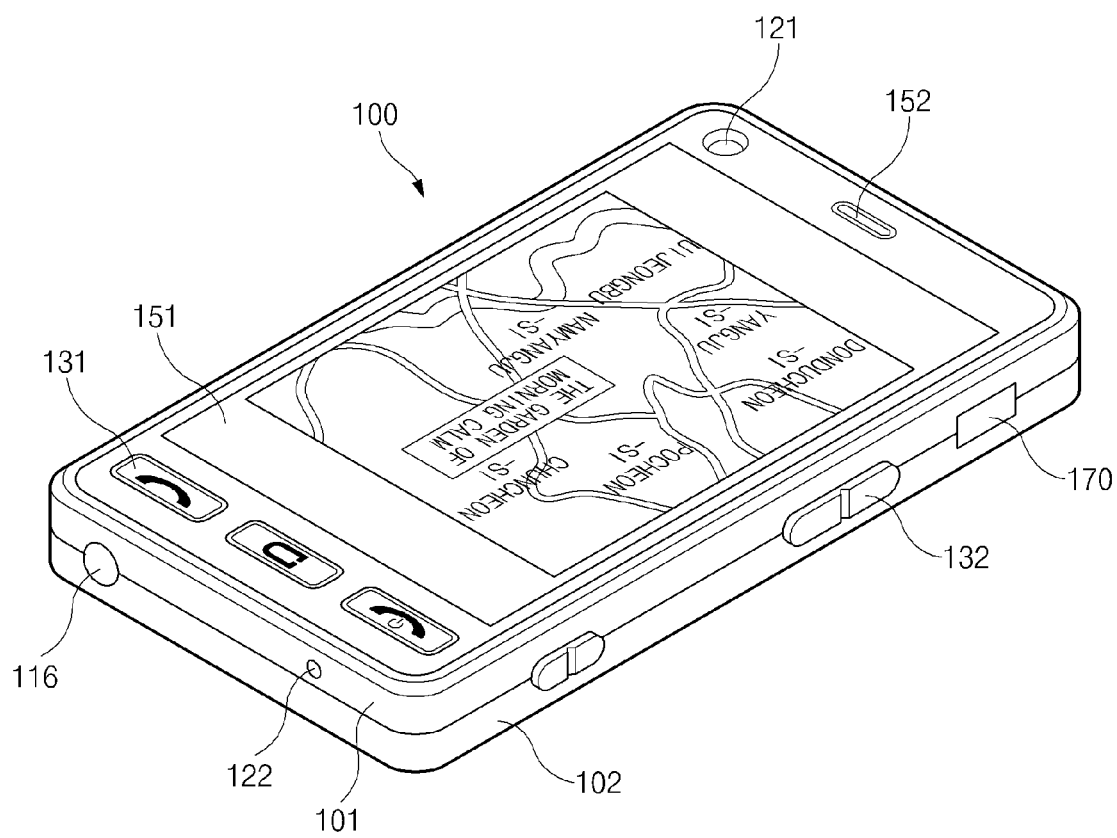
FIG. 2 is a view explaining an external structure of a mobile terminal having the configuration of FIG. 1.

FIG. 2 is a view explaining an outward appearance of the mobile terminal 100 having the configuration illustrated schematically in FIG. 1. Although the mobile apparatus is illustrated as having a bar-shaped body in FIG. 2, other various structures such as a slide type, a folder type, a swing type, or a swivel type, in which two or more bodies are coupled to each other, may be applied to the mobile terminal.

The body of the mobile apparatus 100 may include a case (a casing, a housing, a cover, or the like) that forms an external appearance and the case may be formed of plastic resin by an injection moulding or fabricated of a metal material such as stainless steel (STS) or titanium (Ti).

The sound output unit 152, the camera 121, the user input unit 130, the microphone 122, the interface unit 170, and the like may be arranged in the body of the mobile apparatus 100 in an ergonomic manner.

The display unit 151 occupies most of a main surface that is a front surface of the front case. The sound output module 152 and the camera 121 are arranged in the upper portion of the display unit 151, and the input button 131 and the microphone 122 are arranged in the lower portion of the display unit 151. Other input units 132 of the user input unit 130, the interface unit 170, and the like may be arranged in a lateral surface of the front case and/or rear case.

The user input unit 130 is configured to receive a command for controlling the operation of the mobile terminal 100 from the user and may include a plurality of manipulation units. The plurality of manipulation units are commonly called a manipulation portion and any tactile manner being manipulated by the user's touch may be employed.

The content input by the manipulation units may be set up in various forms. For example, a first manipulation unit may receive commands such as start, close, scroll, and/or the like and the second manipulation unit may receive commands concerning intensity adjustment of sound output from the sound output module 152, conversion into the touch reorganization mode of the display unit 151, and the like.

The display unit 151 may display various pieces of visual information and the visual information may be displayed in various forms of texts, figures, signs, graphics, icons, and the like. These are regularly arranged to be displayed in a type of keypad and one of which is selected and touched by a user to input corresponding information or select a function, thereby being referred to as a 'virtual keypad'.

Figure 3:
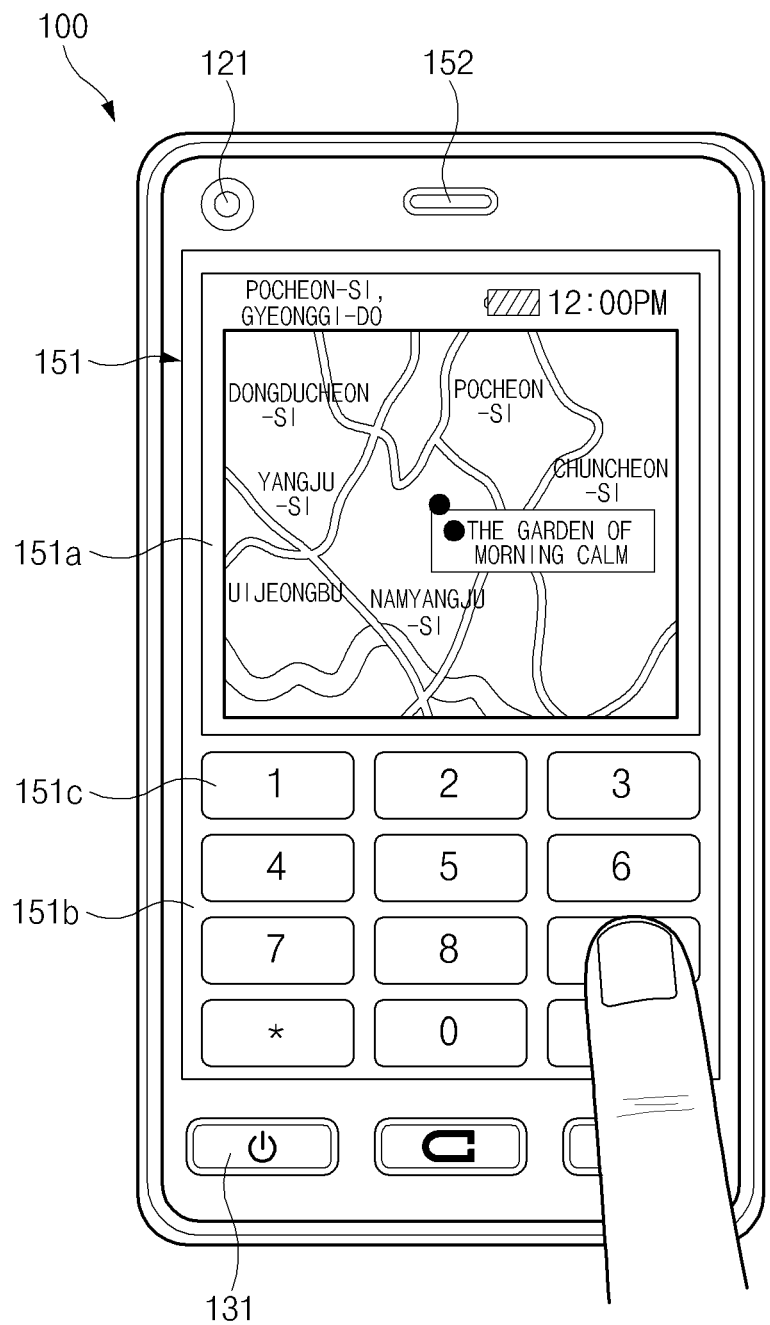
FIG. 3 is a view illustrating user's operation and screen output.

FIG. 3 shows a process of inputting information by a user through a touch input applied to the visual keypad provided in the front window of the mobile apparatus. The display unit 151 is operated as the whole area or as a plurality of divided areas. In the latter case, the plurality of divided areas is configured to be interacted with each other. For example, at the upper and lower portions of the display unit 151, an output window 151a and an input window 151b are arranged, respectively and a visual keypad 151c in which figures for inputting an address/house number, and the like are displayed, is output. When the visual keypad 151c is touched, the figure corresponding to the touched point is displayed at one side area of the output window 151a.

In addition, the touch pad having a layered structure embodied in the display unit 151 may recognize the touch input through dragging and executing processing corresponding to the touch input. That is, the user may move an entity (such as cursor or pointer on the icon or the like) displayed on the display unit 151 by dragging the touched point while maintaining contact on the touch pad of the display unit 151 via a user's finger. In addition, when the user moves her or his finger on the touch pad of the display unit 151, the course according to movement of the finger is visually displayed on the display unit 151. This is used in editing the images displayed on the display unit 151. The display unit 151 shown in FIG. 3 is embodied in the touch screen provided with the function as described above.

Subsequently, an operation of the apparatus having the configuration will be described with reference to a flow chart of FIG. 4. Arrows or graphics having a finger like shape for pointing out or selecting a special object on the display unit 151 are called a pointer or a cursor. However, in the case of the pointer, it is often misunderstood as the finger or stylus pen for operating the touch operation. Accordingly, in the description, to clearly distinguish a finger and a pointer from each other, the graphics displayed on the display unit 151 are referred to as the cursors and the physical mechanism such as a finger or a stylus pen, which may perform touch, proximity touch or gesture, are referred to as the pointer.

Figure 4:
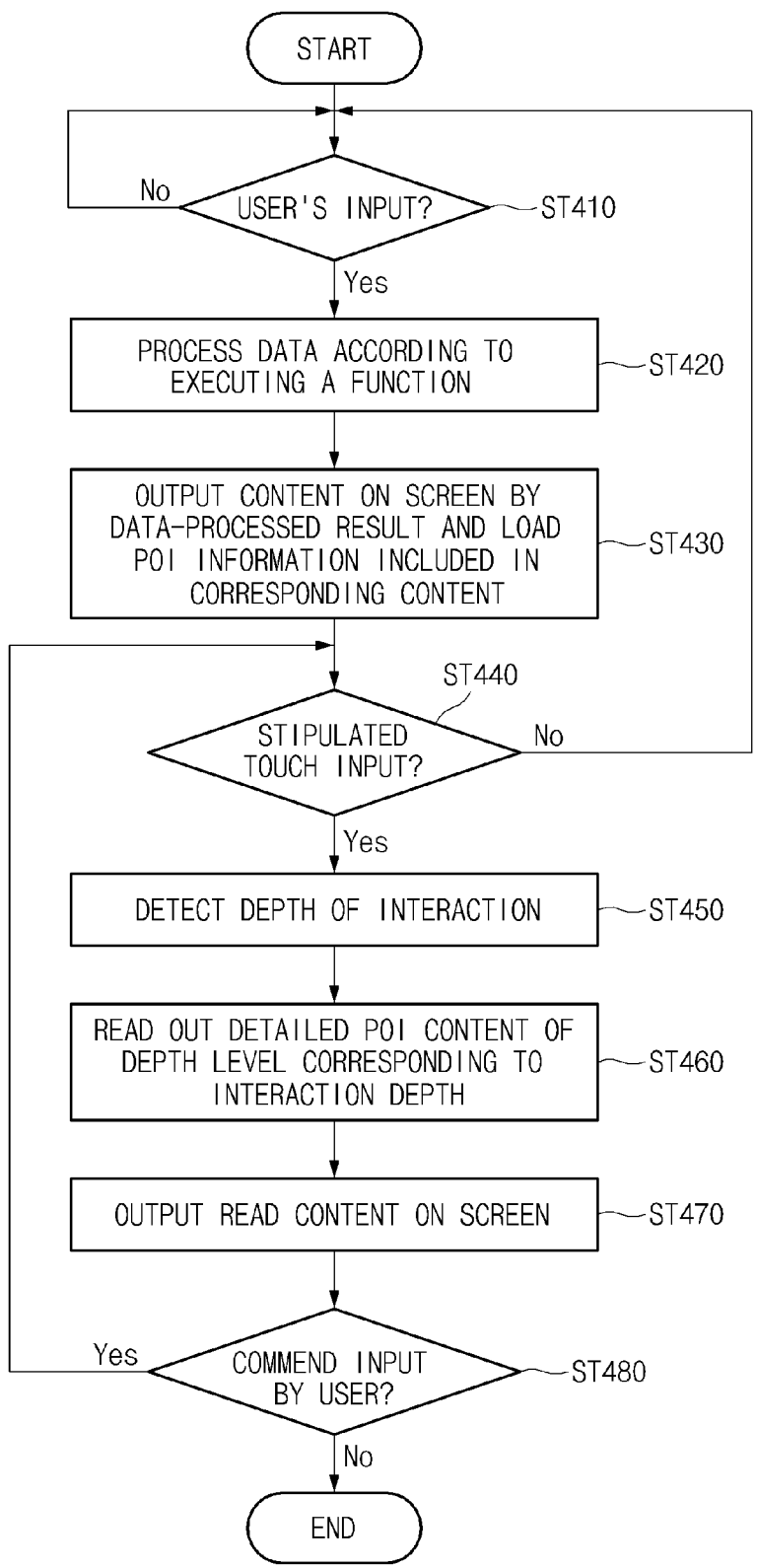
FIG. 4 is a flowchart explaining an operation of an apparatus having the configuration of FIG. 1.
Figure 5:
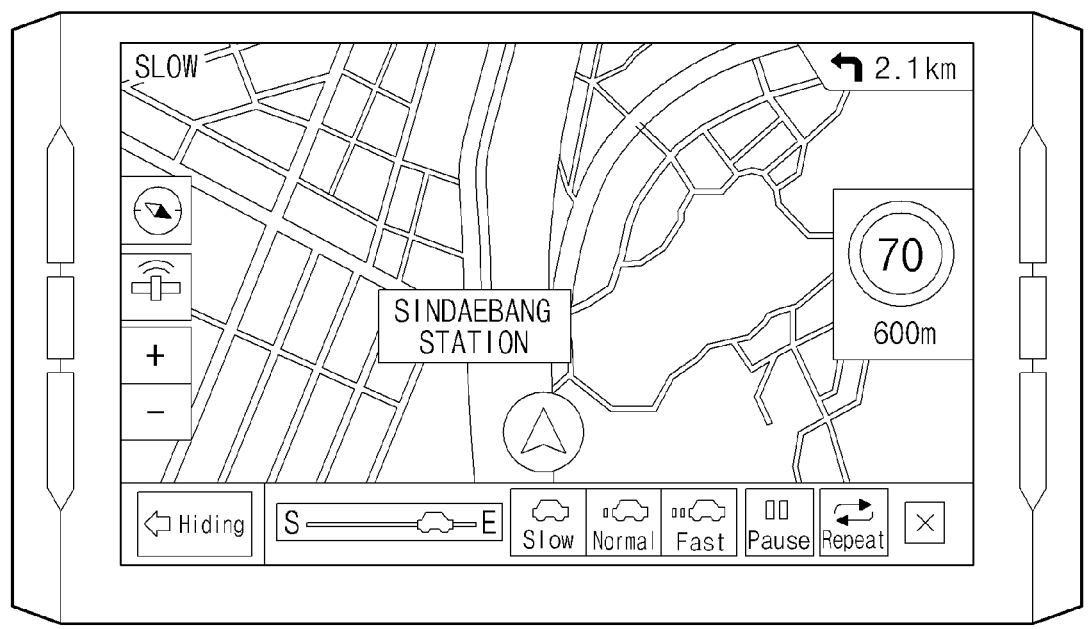
FIG. 5 is a view illustrating a state in which a navigation execution screen is output.

FIG. 4 is a flowchart explaining an operation of a mobile apparatus provided with a function for controlling division screen interlocking display according to an exemplary embodiment. When the user selects any function button provided in the user input unit 130 of the mobile apparatus 100 (ST 410), the control unit 180 reads out the data stored in the memory 160 to execute the data process corresponding to the user's function selection (ST 420). As shown in FIG. 5, the processing result is displayed on the screen (ST 430).

Figure 6:
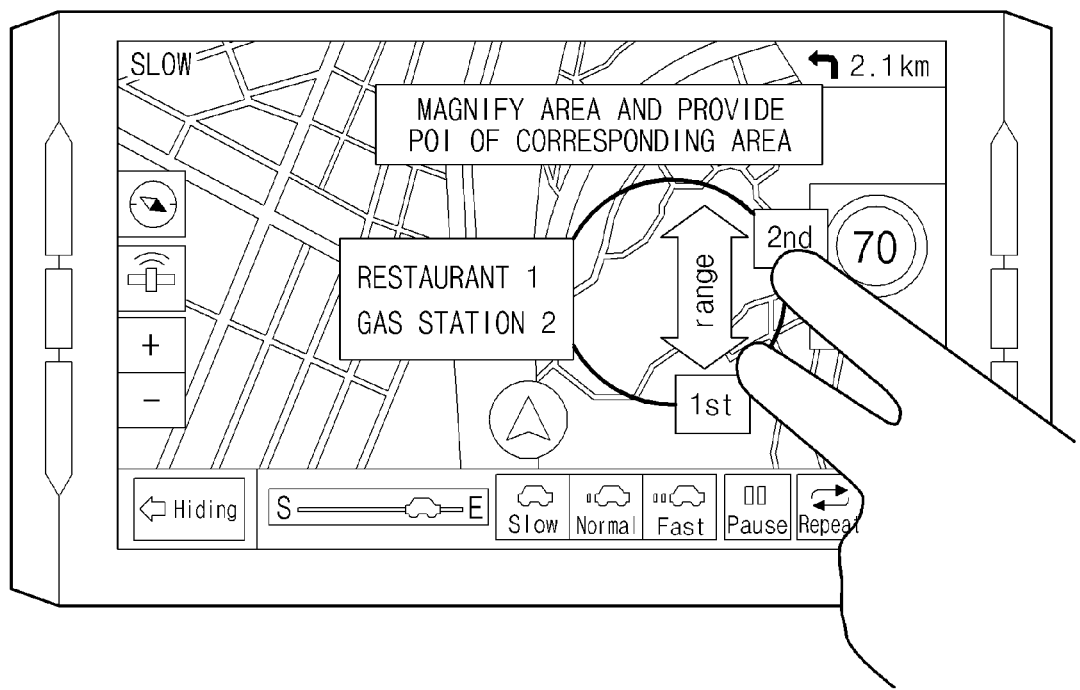
FIG. 6 is a view explaining a process for executing detailed information display of a selected area according to an exemplary embodiment.

FIG. 5 is a view illustrating a screen output when, for example, a navigation function is executed. Subsequently, as shown in FIG. 6, in a state in which a user's one finger touches the center of the content of which detailed information is desired by the user, and within a predetermined time, when a content area in which detailed information is to be output by touching another finger at the boundary point of the content area, the control unit 180 confirms whether or not the user's touch input through the touch interaction module 182 is a stipulated touch input. That is, whether or not the user's touch input is a stipulated interaction in which a distance up to a second touched point with respect to a first touched point becomes radius (ST 440). When it is determined that the user's touch input is the stipulated touch input, the control unit 180 detects a depth of the interaction executed by the touch input (ST 450).

The depth of the interaction denotes a depth of information to be displayed by the user through the touch input. As the depth becomes deeper, subordinate information becomes more detailed as well (i.e., a high-level of detailed information is provided). The control unit 180 reads out detailed information corresponding the depth of the stipulated touch input by the user from the phased detailed information storage unit 140 (ST 460), and then outputs the detailed POI content of the corresponding depth level on the screen (ST 470).

The control 180 confirms whether there is additional user touch input through the touch interaction module 182 (ST 480). When it is determined that there is not the additional touch input, the control unit 180 returns to step ST 440 to confirm whether or not the user touch input is the stipulated touch input. When it is determined that the additional touch input is the touch interaction, the control unit 180 determines the depth of the interaction on the basis of the executed frequency of the touch interaction, a dragging distance, a magnitude of pressure detected from the touch panel, and then outputs detailed information of a corresponding depth level.

In a navigation executing screen as shown in FIG. 6, detailed information which may be of interest to driver such as a famous restaurant, closest gas station, and the like within an area selected by the user, are displayed on the screen according to the executed user touch interaction.

That is, according to the above-described exemplary embodiment, when the user executes the stipulated touch input using the two touch points, the detailed information for the selected area may be displayed using dynamic touch interaction, which can display detailed information or subordinate contents within the area selected by the user. The area selected by the touch interaction may be differently defined, for example, as an area having a diameter which is a distance between two touch points. The recognition distance between the two points may be adjusted according the user's setting up.

In the above-described exemplary embodiment, although a case in which the contents displayed on the screen is navigation information is illustrated, it may be used to confirm or display a submenu in a menu in which a plurality of items is listed on the screen.

Figure 7:
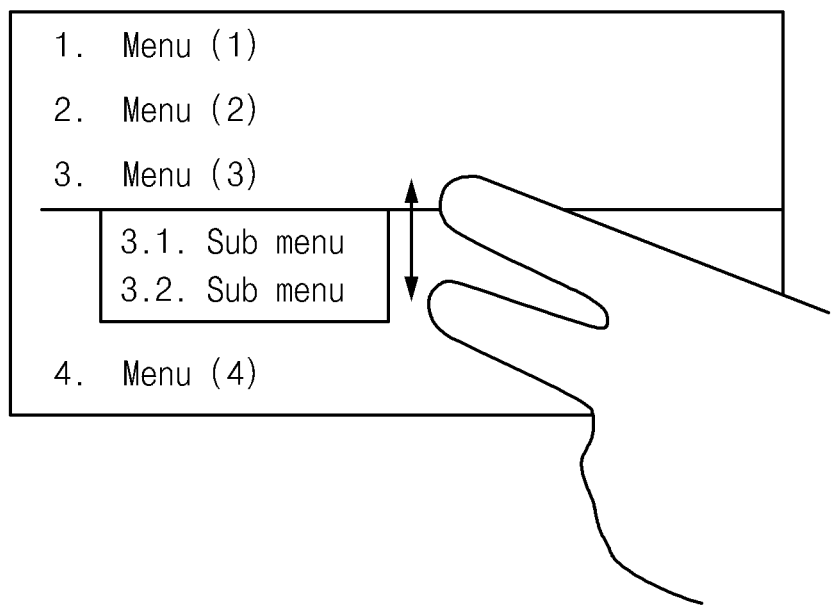
FIG. 7 is a view explaining a function for displaying subordinate items of a selected area under a state in which a menu list is output according to an exemplary embodiment.

That is, as shown in FIG. 7, in outputting the menu on the screen, when executing the stipulated touch interaction by selecting an area of which the user wishes to know detailed information among the main items of the list, a subordinate information included between the main items may be selected by the user through a simple two point touch and drag interaction with the face of the display screen. Thus, it is possible to confirm or output the subordinate detailed information through a simple touch input operation.

Meanwhile, when the touch input by the user is dragged in an opposite direction to the above-described drag direction, that is, when the touch input by the user is dragged so that the two points are moved closer to each other, the touch interaction module 182 recognizes the touch input as a command for outputting super ordinate representative information contrary to the touch input for outputting the above-described detailed information, and reports the command to the control unit 180. The control unit 180 then reads outs content having a depth of super ordinate level from the phased detailed information storage unit 140 on the basis of command, and outputs read result on the screen accordingly. Therefore, the representative information is displayed on the screen based upon user preference.

The present invention is not limited to the above-described exemplary embodiment and it is possible to variously modify within a scope of the present invention. For example, in the processes of loading information and reading out contents in steps ST 430 and ST 460, the control unit 180 may execute processes of dividing the detailed POI information according the depth levels and separately storing the divided detailed POI information to each of storage areas allocated according to the sections of the phased detailed information storage unit 140. Alternatively, the control unit 180 may be embodied such that the information to be output to each section of the screen from the memory 160 is directly accessed and then output, without a separate division storage process.

Meanwhile, various functions according to the present invention may be embodied by adding a separate hardware. However, it may be embodied as a processor-readable code in a medium in which programs are recorded. The medium includes a ROM, a RAM, a CD-ROM, a magnetic tape, a floppy disk, an optical data storage device, and the like. It may be configured in a carrier wave form (in the case of transmitting through Internet). Further, the present invention is not limited to the above-described exemplary embodiments. It may be configured by combination of all or some of the configurations disclosed in each exemplary embodiment.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling an amount of detailed information displayed in a selected area using dynamic touch interaction in a mobile terminal including a touch screen, the apparatus comprising:
   a memory configured to store contents to be output through the touch screen as data;
   a touch interaction module configured to analyze a user's touch input through the touch screen and identify a stipulated touch interaction; and
   a control unit configured to control an overall operation of the apparatus according to the user's input through the touch screen, and control an amount of subordinate detailed information to be displayed in an area on the touch screen based on a stipulated touch input by the user when the stipulated touch input is identified by the touch interaction module, based on the data stored in the memory,
   wherein a response of the overall operation of the apparatus differs based on an interaction between the stipulated touch input by the user and a varying amount of subordinate detailed information displayed in the area on the touch screen, and
   wherein the memory is a phased detailed information storage unit that divides and stores detailed point of interest (POI) information for the contents to be output through the touch screen based on a control command from the control unit based on depth levels and content information corresponding to a depth level according to executing the user's stipulated touch input is configured to be separately stored in a plurality of storage areas in the storage unit which is allocated based on the depth levels.

2. The apparatus of claim 1, wherein the touch interaction module is embodied within the control unit.

3. A non-transitory computer readable medium containing program instructions executed by a processor or controller, the computer readable medium comprising:
   program instructions that recognize touch input of a first pattern input through a touch screen, by a touch module;
   program instructions that detect an interaction depth of the first touch input when the touch input of the first pattern is recognized;
   program instructions that read out detailed point of interest (POI) information of depth levels corresponding to the interaction depth detected from the detecting an interaction depth of the touch input; and
   program instructions that output contents of information read from the detailed POI information on the touch screen based upon the corresponding interaction depth detected,
   wherein program instructions that detect the interaction depth differ based on determining the interaction depth by generalizing a number of executed touch inputs of the first pattern, a drag distance, a magnitude of a pressure detected on the touch panel and a varying amount of subordinate detailed information displayed in an area on the touch screen, and
   wherein the contents of the program instructions that read out detailed point of interest (POI) information are based on dividing by the control unit the detailed POI information based on the depth levels and separately storing the divided detailed POI information to a plurality of storage areas.

4. A method of controlling detailed information display for a selected area using dynamic touch interaction in a mobile terminal including a memory that stores contents to be output through a touch screen as data, and a control unit that controls contents according to a user command to be output based on the data stored in the memory, the method comprising:
   recognizing touch input of a first pattern input through the touch screen, by a touch module;

detecting, by a control unit, an interaction depth of the first touch input when the touch input of the first pattern is recognized;

reading out detailed point of interest (POI) information, via the control unit, of depth levels corresponding to the interaction depth detected from the detecting an interaction depth of the touch input; and outputting, by the control unit, contents of the information read from the detailed POI information on the touch screen, wherein the detecting an interaction depth differ based on determining the interaction depth by generalizing a number of executed touch inputs of the first pattern, a drag distance, a magnitude of a pressure detected on the touch panel and a varying amount of subordinate detailed information displayed in the selected area on the touch screen, and wherein the contents of the information read from the detailed POI information are based on dividing by the control unit the detailed POI information based on the depth levels and separately storing the divided detailed POI information to a plurality of storage areas.

5. The method of claim 4, wherein the contents output on the touch screen are configured as navigational information, the detailed POI information includes at least one of geographic information, location information, and building information of a main building or a place included in the area selected by the touch input of the first pattern.

6. The method of claim 4, wherein the contents output on the touch screen includes a menu list of information, the detailed POI information includes subordinate item information included in the area selected by the touch input of the first pattern.

7. The method of claim 4, wherein the touch input of the first input is executed by dragging or flicking at least one touch point.

8. The method of claim 4, further comprising:
inputting a touch input of a second pattern in which two pointers touched on a screen of the touch screen are dragged closer each other; and
detecting an interaction depth of the second touch input when the touch input of the second pattern is recognized,
wherein reading out contents includes reading out detailed POI information of a super ordinate depth level corresponding to the interaction depth of the second pattern from the memory when the touch input of the second pattern is recognized.

9. The method of claim 4, wherein the touch input of the first pattern includes selecting an area with two pointers that are touched by the user on the touch screen.

10. The method of claim 9, wherein the touch input of the first pattern includes defining an area having a radius that is distance from a first touch point in the center of the content to a second touch point when a second touch pointer touches on the screen of the touch screen within a predetermined time from when the first pointer touches the touch screen.

* * * * *